United States Patent [19]

Laughlin

[11] 3,816,949

[45] June 18, 1974

[54] VERTICAL INDEX DEVICE

[75] Inventor: Clayton Austin Laughlin, Minneapolis, Minn.

[73] Assignee: Standard Packaging Corporation, New York, N.Y.

[22] Filed: June 27, 1972

[21] Appl. No.: 266,621

[52] U.S. Cl. .......... 40/104.01
[51] Int. Cl. .......... G09f 11/06
[58] Field of Search .......... 40/104.01, 102, 103, 120, 40/104 A

[56] References Cited

UNITED STATES PATENTS

| | | | |
|---|---|---|---|
| 856,841 | 6/1907 | Birnbach | 40/104.01 |
| 2,524,704 | 10/1950 | Henderson | 40/104.01 |

*Primary Examiner*—Wm. H. Grieb
*Assistant Examiner*—J. H. Wolfe
*Attorney, Agent, or Firm*—Amster & Rothstein

[57] ABSTRACT

A vertical index device is provided including a series of index cards supported in an upright position between a vertical plate and a pivotable cover. The index device is opened to any desired index card by depressing one of a series of card actuators which extend upwardly from the top of the index device.

6 Claims, 6 Drawing Figures

VERTICAL INDEX DEVICE

This invention relates to an index device and, more particularly, to a vertical index mechanism suitable for use as a telephone index in which information is recorded on a series of index cards.

Prior art index devices having selector means for exposing one desired index card or sheet out of a series of such cards or sheets include selector mechanisms which are either inaccurate and unreliable or which are unduly complex and expensive to manufacture. Moreover, some prior art devices include one mechanism for selecting the desired index card and another mechanism for opening the index device. Accordingly, such devices require two separate operations; and as two separate mechanisms are included, the chances of the device failing are increased. The industry has recognized the need for a simple, reliable and economical index device suitable for manufacture on a mass production basis.

Accordingly, it is an overall object of this invention to provide a device for automatically retrieving a desired index card and, more particularly, a vertical index device wherein the components are relatively inexpensive, easy to assemble, and yet highly reliable.

Briefly, in accordance with the principles of the present invention, a vertical index device is provided which is adapted to stand on any flat surface, such as on a desk or on a table top. The desired information is recorded on a series of index cards supported in an upright position between an upstanding chassis plate and a pivotable cover. The index device is opened to any desired index card by depressing one of a series of card actuators which extend upwardly from the top of the index device. Each card actuator includes an upper rigid section and a lower flexible section with a push rod extending forward from the flexible section. The index card adjacent the chassis plate is provided with a number of actuating holes, preferably corresponding to the number of card actuators, and each outwardly succeeding index card is provided with a different hole pattern, for example, each card may have one less actuating hole than the inwardly adjacent card. When the selected card actuator is depressed, the lower flexible section flexes outwardly driving the associated push rod forward through one or more of the actuating holes in the index cards, including the selected index card, leaving it in an upright position. The remaining index cards and cover are engaged by the actuated push rod and pivoted downwardly, exposing the selected index card to the user. To close the index device, a closing actuator is depressed which includes a lever arm for engaging the cover to pivot it upwardly to the closed position.

The vertical index device of the present invention provides a number of advantages over the prior art arrangements. Most important, each of the components of the vertical index device, i.e., the index cards and their actuating holes; the card actuators and their associated push rods; the pivotable cover and its opening and closing mechanisms; are simple mechanical devices which are relatively inexpensive. Accordingly, the vertical index device of the present invention is not only economical, but is highly reliable. In addition, the actuating mechanism of the present invention is positive-acting and will accurately retrieve and present the selected index card to the user of the device. More particularly, the cover and cards are primarily gravity-operated and will not pivot open unless the selected card actuator is depressed sufficiently to extend the associated push rod far enough forward to apply enough opening force to the cover. When the actuated push rod is extended far enough forward to apply such an opening force to the cover, the actuated push rod will be projected through succeeding index cards until the selected index card is reached to pivot the remaining index cards downwardly with the cover. Accordingly, the index device of the present invention will not open unless the actuated push rod extends fully through the selected index card thereby avoiding exposure of the wrong index card.

Further objects, features and advantages of the present invention will become apparent upon the consideration of the following detailed description of a presently preferred embodiment taken in conjunction with the accompanying drawings, wherein.

Figures 1, 2, 3, 6:
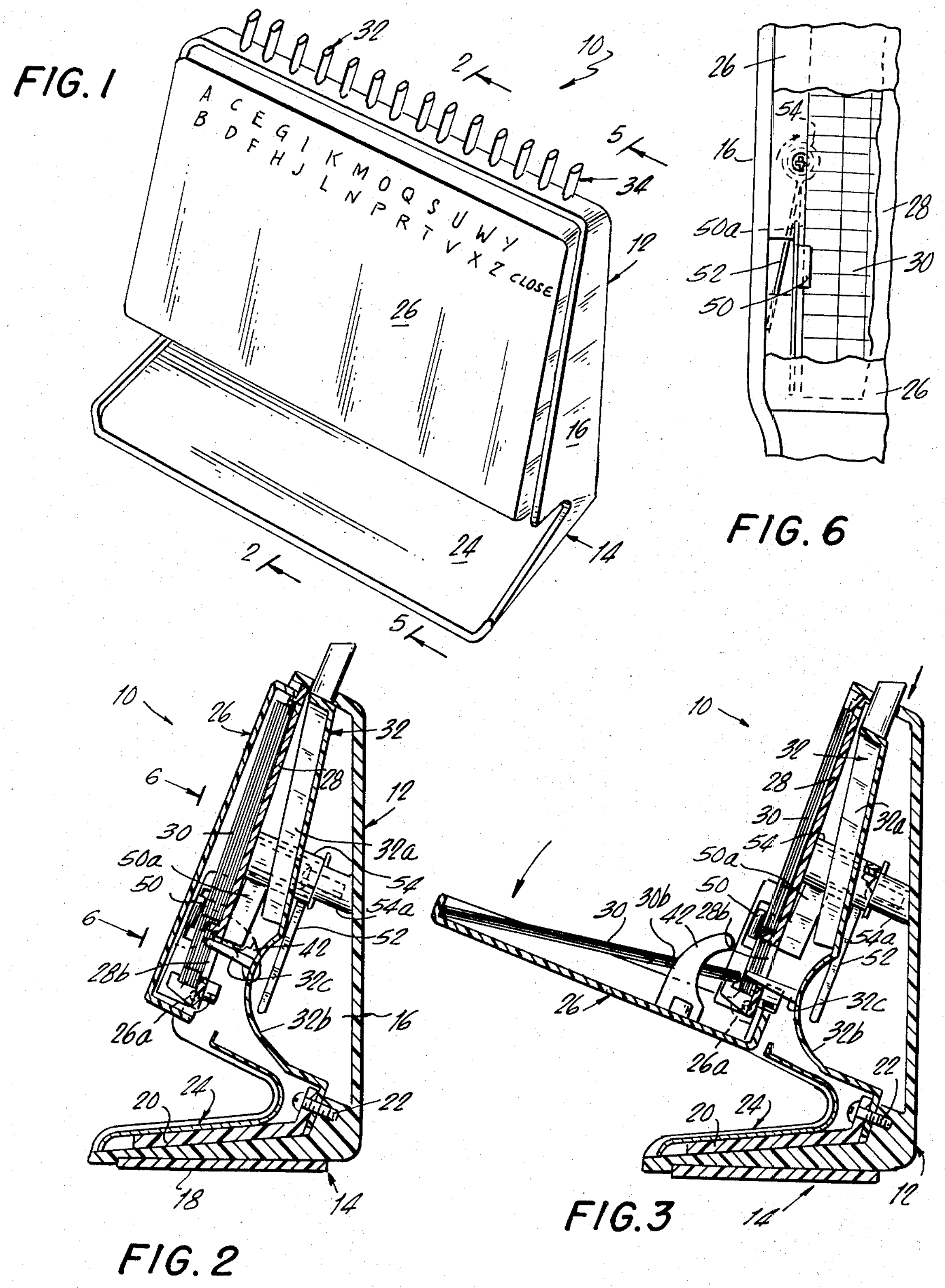
FIG. 1 is a perspective view of the vertical index device of the present invention.
FIG. 2 is a sectional view of the vertical index device taken on line 2—2 of FIG. 1 looking in the direction of the arrows.
FIG. 3 is a sectional view of the vertical index device with the cover pivoted downwardly so that the selected index card is exposed.
FIG. 6 is a sectional view of the retaining member in detail, taken on line 6—6 of FIG. 2.

Referring now to FIG. 1, the vertical index device of the present invention, which is generally designated by the reference numeral 10, comprises a housing 12 which includes a horizontal base portion 14 and a vertical portion 16. The vertical index device 10 may be positioned to stand on any flat surface, such as on a desk or a table top, and includes a pad 18, such as a desk pad, attached to the underside of horizontal base portion 14 so that the vertical index device 10 will not damage any surface on which it is placed. To stabilize the vertical index device 10 in an upright position, a weight 20 is attached, as by a screw 22, to the horizontal base portion 14. A U-shaped aluminum shield 24 is also attached to the horizontal base portion 14 and is arranged to enclose the lower section of the vertical index device 10. The front portion of housing 12 is provided with a cover 26 which is pivotally attached at its lower ends 26*a* to a vertical plate 28 which forms a portion of housing 12. The lower end of vertical plate 28 includes a longitudinally extending channel 28*a* on which a series of index cards 30 may be supported in an upright position between vertical plate 28 and cover 26. The lower end of vertical plate 28 is also provided with a series of holes 28*b* for a purpose to be described.

In order to open the vertical index device 10 to the desired index card 30, a series of card actuators 32 are provided and each includes an upper rigid section 32*a* and a lower flexible section 32*b*, such as a spring. Card actuators 32 are attached at their lower ends to base portion 14 as by screws 22. A push rod 32*c* is fixedly attached to each flexible section 32*b* and extends forwardly thereform to pass through actuating holes 28*b* and actuating holes 30*a* formed within index cards, in a manner to be described. Each of the push rods 32*c* vary in length depending on the number of index cards 30 they must pass through to pivot cover 26 downwardly.

In the present illustrated embodiment, the vertical index device 10 of the present invention is employed as a telephone index device, although it should be clear that the vertical index device may be adapted to store any type of information. In accordance with the illustrated example, 14 index cards 30 are provided so that one letter of the alphabet may be included on each side of each index card, with one side of the first and last cards not being utilized. It is to be understood, however, that this is by way of example only, and that the number of index cards 30 may be varied in accordance with the amount and type of information required to be recorded on each index card.

Figure 4:
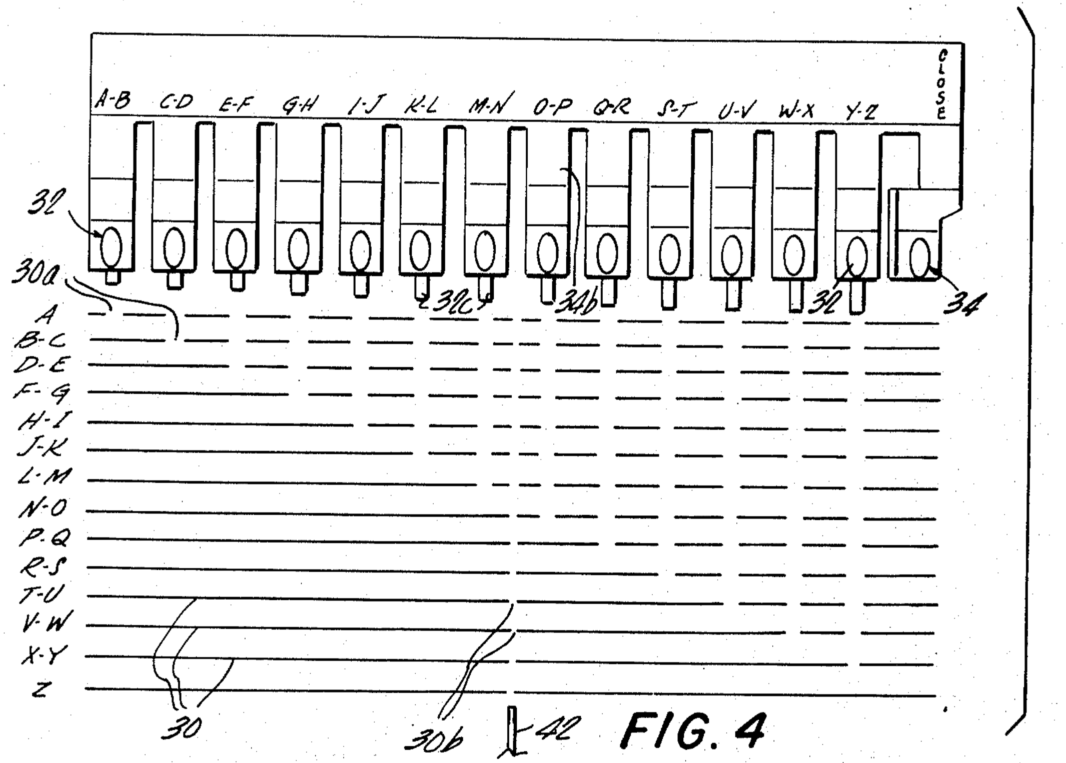
FIG. 4 is an exploded plan view of the actuating mechanism showing the associated index cards and actuating holes of the present invention.

No matter what type of information is stored on the index cards of the vertical index device 10 of the present invention, the number of index cards 30 included within the device determines the number of push rods 32*c*. In the present example, as one side of the first and last index cards 30 are not utilized, the number of index cards 30 must be one larger than the number of push rods 32*c*. The number of push rods 32*c* also determines the number of actuating holes 28*b* and 30*a* which are required. As shown in FIG. 4, the index card 30, adjacent vertical plate 28, and vertical plate 28 are each provided with the number of respective actuating holes 30*a*, 28*b* which corresponds to the number of push rods 32*c*. Each succeeding index card 30 outwardly therefrom will be provided with one less actuating hole 30*a*, so that the index card 30 adjacent pivotable cover 26 is not provided with an actuating hole 30*a*.

Accordingly, in the present illustrative example of a telephone index device, the inclusion of 14 index cards 30 determines that there will be 13 push rods 32*c*, 13 actuating holes 28*b* formed in vertical plate 28, and 13 actuating holes 30*a* formed in the index card adjacent vertical plate 28. In addition, each succeeding index card is provided with one less actuating hole 30*a*, so that the 14th index card 30 (the one closest to cover 26) is not provided with an actuating hole 30*a*, as it is always pivoted downwardly with cover 26.

It should be understood, that if a larger index device is required to store more information, for example, an index device having 25 index cards, then in accordance with the principles of the present invention, there would be 24 push rods 32*c*, and the index card 30 adjacent vertical plate 28 would be provided with 24 actuating holes 30*a*; and each succeeding index card would be provided with one less actuating hole 30*a* so that the outermost index card 30 (the one closest to cover 26) will not be provided in actuating 30*a*.

Figure 5:
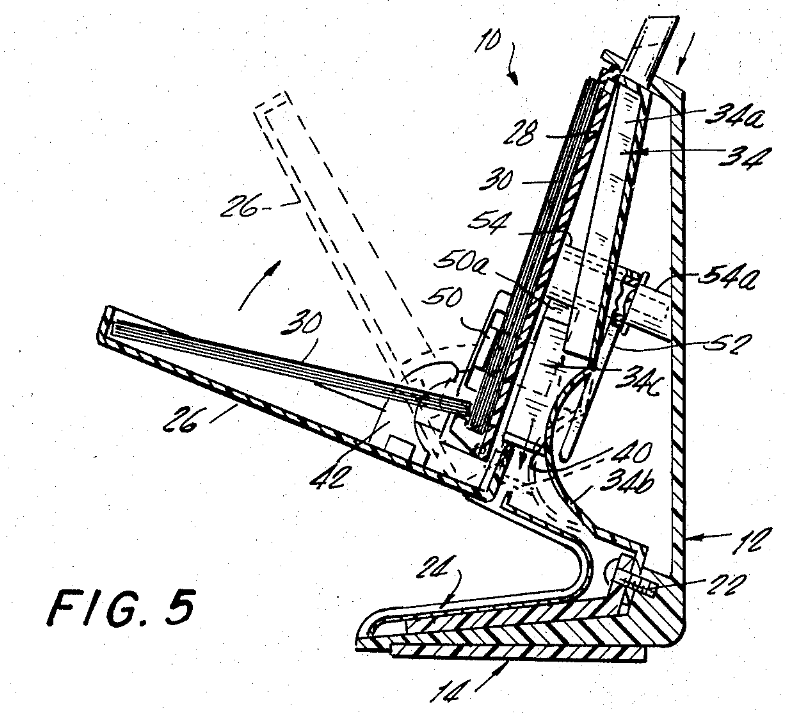
FIG. 5 shows a sectional view of a vertical index device including the closing actuator of the present invention for returning the cover and unselected index cards to the closed position.

As may be seen in FIG. 4, in addition to card actuators 32, a single closing actuator 34 is also provided, however, without a push rod 32*c*. Closing actuator 34 is provided to return cover 26, and index cards 30 which have been pivoted downwardly, back to an upright position to close the vertical index device 10. As shown most clearly in FIG. 5, closing actuator 34 includes rigid sections 34*a*, 34*c*, which are attached to each other, and a flexible section 34*b*. The bottom surface of rigid section 34*c* defines a lever arm 40, which, upon actuation of closing actuator 34 engages and maintains contact with the lower inwardly extending end of cover 26 as closing actuator 34 is moved downwardly. In this manner, as lever arm 40 moves downwardly, it will exert a force or camming action against the lower inwardly extending end of cover 26 which will cause cover 26 to pivot upwardly about pivots 26*a* to close cover 26 of the index device 10 of the present invention.

A guide 42 is fixedly attached to cover 26 to maintain index cards 30 in proper alignment. More particularly, each index card 30 is provided with a central alignment hole 30*b* through which guide 42 extends. When the index device 10 is in the open position, as shown in FIG. 3, guide 42 maintains index cards 30 in proper alignment. When cover 26 is closed, guide 42 extends through alignment holes 30*b* of those index cards 30 which remained in the upright position, to bring all of the index cards 30 back into proper alignment for subsequent operations.

In order to retain the unactuated index cards 30 in an upright position, a retaining member 50 is provided which is connected via a member 50*a* to a sleeve 54. The sleeve 54 is mounted on a projection 54*a* formed on vertical frame wall 16. Also connected to sleeve 54 is an elongated biasing member 52. As shown most clearly in FIG. 6, retaining member 50 extends through an opening 28*c* formed in vertical plate 28, and when index cards 30 are pivoted downwardly, retaining member 50 will be forced to the left in FIG. 6 by cards 30. As retaining member 50 moves to the left, sleeve 54 and biasing member 52 are rotated in a clockwise direction and the biasing member 52 is urged against side frame wall 16. After the index cards 30 are pivoted downwardly by the actuated push rod 32*c*, and retaining member 50 is no longer being forced to the left, biasing member 52 urges sleeve 54 and retaining member 50 towards the index cards 30 which remain in an upright position. In this manner, retaining member 50 engages and retains the unactuated index cards 30 in an upright position.

It should be clear, that while the index device of the present invention is in the open position, as shown in FIG. 3, any index card 30 may be removed and replaced or exchanged for new index cards as they wear out, or as new information is required. It should also be clear, that index cards 30 may be removed in order to record any additional information thereon.

The operation of the vertical index device 10 of the present invention will now be explained. By way of example only, the vertical index device is employed as a vertical telephone index device containing the telephone numbers of individuals, companies, etc. alphabetically arranged on index cards 30. However, it is to be clear that index cards 30 may contain any type of information, and that each of the card actuators 32 may be appropriately marked to direct the user of the device to the appropriate index card containing the desired information.

Accordingly, if the vertical index device 10 of the present invention is utilized as a telephone index device, and it is desired to obtain a telephone number of a person having a name beginning with the letters A or B, then the card actuator 32 marked with letters A and B is depressed. The upper rigid section 32*a* of the depressed card actuator 32 will then move downwardly, and the lower flexible section 32*b* will be flexed outwardly, driving the associated push rod 32*c* forward. The actuated push rod 32*c* is extended outwardly through actuating hole 28*b* formed in vertical plate 28 and through actuating hole 30*a* formed in the index card 30 adjacent vertical plate 28. As the actuated push rod 32*c* extends through the index card 30 marked with the letter A (see FIG. 4) and maintains that index card in an upright position, it engages the index card 30 marked BC and pivots that index card and all of the subsequent cards and cover 26 downwardly. In this manner, the user of the vertical telephone device 10 will be able to observe the information recorded on the face of the A index card 30 which is in the upright position and on the top surface marked B of the BC index card 30 which has been pivoted downwardly. When cover 26 opens, the depressed card actuator 32 may be released, and flexible section 34*b* returns rigid section 34*a* upwardly. The 13 index cards 30 from BC to Z, which have been pivoted downwardly with cover 26, are maintained in proper alignment by guide 42.

If information beginning with the letters Y or Z is desired, the YZ card actuator 32 is depressed and the associated push rod 32*c* will extend through the corresponding actuating holes 30*a* formed in the 13 index cards 30 adjacent vertical plate 28, including the XY index card, and directly engage the Z index card 30 and cover 26 to pivot it downwardly. Accordingly, all of the index cards, except the Z index card 30, will remain in an upright position. In this manner, the user of the vertical telephone index device 10 will be able to observe the information recorded on the Y face of the outermost YZ index card 30, which is in the upright position, and on the top surface marked Z of the Z index card 30 which has been pivoted downwardly.

After the desired information has been obtained from the selected index card 30, the cover 26 (and any index cards 30 which have been pivoted downwardly) of the vertical index device 10 may be returned to the closed position automatically. The operator merely depresses closing actuator 34 (marked closed) and lever arm 40 engages the lower end of cover 26 to pivot it upwardly and closed with the actuated index cards.

A latitude of modification, change and substitution is intended in the foregoing disclosure and in some instances, some features of the invention will be employed without a corresponding use of other features. Accordingly, it is appropriate that the appended claims be construed broadly and in a manner consistent with the spirit and scope of the invention herein.

What is claimed is:

1. A vertical index device comprising a base, an upstanding substantially vertical housing mounted on said base and including openings formed in the top thereof, a plurality of index cards supported in said vertical housing in an upstanding position and in a side-by-side manner, a pattern of actuating holes formed in said index cards, a plurality of individually operable and upstanding actuating mechanisms mounted in said housing in a substantially vertical plane, each of said actuating mechanisms being associated with a different portion of said pattern of actuating holes in said index cards and including a rigid section and a flexible section, said rigid sections extending through the openings formed in the top of said vertical housing and mounted for movement relative thereto, said flexible sections adapted to be actuated by manual actuation of said rigid sections relative to said vertical housing, and said flexible sections including means adapted to be extended through at least one of said actuating holes of an associated index card for engaging and indexing an adjacent index card from its upstanding position.

2. A vertical index device in accordance with claim 1 wherein said engaging and indexing means include push rods associated with said pattern of actuating holes and adapted upon actuation of said flexible sections to be extended through the actuating hole of an associated index card for engaging and indexing an adjacent index card.

3. A vertical index device in accordance with claim 2 further including means for maintaining said plurality of index cards in proper alignment.

4. A vertical index device in accordance with claim 2 further including means for maintaining at least one of said index cards in an upstanding position within said vertical housing after the other index cards have been engaged and indexed from their upstanding positions by said actuating mechanisms.

5. A vertical index device in accordance with claim 1 wherein said vertical housing further includes a cover, means for pivotally mounting said cover on said housing, and means for pivoting said cover relative to said housing.

6. A vertical index device in accordance with claim 5 wherein said means for pivoting said cover includes lever means for engaging said cover and means for actuating said lever means to pivot said cover.

* * * * *